United States Patent
Ling et al.

(10) Patent No.: US 11,633,650 B2
(45) Date of Patent: Apr. 25, 2023

(54) COMPOSITE GOLF CLUB HEAD AND METHOD FOR MANUFACTURING THE SAME

(71) Applicant: O-TA PRECISION INDUSTRY CO., LTD., Pingtung County (TW)

(72) Inventors: Chi-Wen Ling, Pingtung County (TW); Wei-Hsiang Chou, Pingtung County (TW); Fang-Yu Liu, Pingtung County (TW)

(73) Assignee: O-TA PRECISION INDUSTRY CO., LTD., Pingtung County (TW)

( * ) Notice: Subject to any disclaimer, the term of this patent is extended or adjusted under 35 U.S.C. 154(b) by 0 days.

(21) Appl. No.: 17/162,789

(22) Filed: Jan. 29, 2021

(65) Prior Publication Data
US 2021/0236889 A1     Aug. 5, 2021

(30) Foreign Application Priority Data
Jan. 31, 2020     (TW) .................................. 109102995

(51) Int. Cl.
*A63B 53/04*     (2015.01)
*B29C 70/44*     (2006.01)
(Continued)

(52) U.S. Cl.
CPC ...... *A63B 53/0466* (2013.01); *A63B 53/0475* (2013.01); *B29C 70/443* (2013.01);
(Continued)

(58) Field of Classification Search
CPC .................................................. A63B 53/04
(Continued)

(56) References Cited

U.S. PATENT DOCUMENTS 5,511,787 A * 4/1996 Baum ................... B29C 70/086
                                                          473/343
5,766,091 A * 6/1998 Humphrey ............. A63B 53/04
                                                          473/409
(Continued)

FOREIGN PATENT DOCUMENTS

CN           1179839 C      12/2004
CN        110652711 A *      1/2020
(Continued)

OTHER PUBLICATIONS

Examination opinions dated Jul. 30, 2021 by Taiwan's Intellectual Property Office regarding this application's counterpart application in Taiwan (No. 109102995 filed Jan. 31, 2020).

*Primary Examiner* — Alvin A Hunter
(74) *Attorney, Agent, or Firm* — Pai Patent & Trademark Law Firm; Chao-Chang David Pai

(57) ABSTRACT

A composite golf club head and a method for manufacturing the same are provided. The composite golf club head has a carbon fiber composite body and a striking face. The carbon fiber composite body is formed by multiple carbon fiber prepreg materials or multiple composite prepreg materials including carbon fiber with stacking, a positive pressure, a vacuum negative pressure, and heating. The striking face is made of a carbon fiber composite or metal material, and is fixedly glued to a front opening portion of the carbon fiber composite body. A weight of the carbon fiber composite body is reduced. Center of gravity and moment of inertia can be adjusted easily according to striking distances or feel of striking of different golf club heads for enhancing a striking performance of the composite golf club head.

9 Claims, 7 Drawing Sheets

(51) Int. Cl.
   *B29L 31/52* (2006.01)
   *B29K 307/04* (2006.01)
   *B29K 105/08* (2006.01)

(52) U.S. Cl.
   CPC ... *A63B 2209/02* (2013.01); *B29K 2105/0872* (2013.01); *B29K 2307/04* (2013.01); *B29L 2031/5227* (2013.01)

(58) Field of Classification Search
   USPC .................................................. 473/324–350
   See application file for complete search history.

(56) References Cited

U.S. PATENT DOCUMENTS

| | | | | |
|---|---|---|---|---|
| 5,985,197 | A | * | 11/1999 | Nelson .................... B29C 33/40 156/194 |
| 6,010,411 | A | | 1/2000 | Reyes |
| 6,248,024 | B1 | * | 6/2001 | Nelson .................... A63B 53/04 473/347 |
| 6,340,509 | B1 | * | 1/2002 | Nelson .................... B62K 19/16 280/281.1 |
| 2004/0097301 | A1 | | 5/2004 | Lee et al. |
| 2016/0038799 | A1 | | 2/2016 | de la Cruz et al. |
| 2019/0126110 | A1 | * | 5/2019 | Parsons .................... A63B 1/00 |
| 2019/0388743 | A1 | * | 12/2019 | Hsu ........................ B29C 70/72 |

FOREIGN PATENT DOCUMENTS

| | | | | |
|---|---|---|---|---|
| EP | 0895822 | A1 | * 2/1999 | |
| GB | 2330539 | A | * 4/1999 | ............ A63B 53/04 |
| JP | H06304272 | A | * 11/1994 | |
| TW | I657849 | B | 5/2019 | |
| TW | 202000433 | A | 1/2020 | |
| WO | WO-9305851 | A1 | * 4/1993 | ............ A63B 53/04 |
| WO | WO-9635485 | A1 | * 11/1996 | ............ A63B 53/04 |
| WO | WO-2018131585 | A1 | * 7/2018 | ............ A63B 53/04 |

* cited by examiner

```
┌─────────────────────────────────────────────────┐
│ Stacking multiple carbon fiber prepreg          │
│ materials or multiple composite prepreg         │
│ materials including carbon fiber on a side wall │
│ of the mold cavity of the mold to form the mold │
│ to form a carbon fiber composite club head      │
│ blank having a hosel and a front opening        │
│ portion and being hollow                        │
└─────────────────────────────────────────────────┘
                        ↓
┌─────────────────────────────────────────────────┐
│ Applying a vacuum negative pressure to an outer │
│ side and an inner side of the carbon fiber      │
│ composite club head blank in the mold by the    │
│ hot pressing auxiliary forming mechanism,       │
│ simultaneously applying a positive pressure to  │
│ an inner side of the carbon fiber composite     │
│ club head blank, and heating the carbon fiber   │
│ composite club head blank by the heater         │
└─────────────────────────────────────────────────┘
                        ↓
┌──────────────────────────────┐  ┌──────────────────────────┐
│ Applying a removal leftover  │  │ Providing a strike face  │
│ and surface finishing process│  │ pre-formed by one of a   │
│ to the carbon fiber composite│  │ metal material and a     │
│ preliminary to form a carbon │  │ composite material       │
│ fiber composite semi-finished│  │ including carbon fiber   │
│ product                      │  │                          │
└──────────────────────────────┘  └──────────────────────────┘
                        ↓
┌─────────────────────────────────────────────────┐
│ Gluing and fixing the strike face on a front    │
│ opening portion of the carbon fiber composite   │
│ semi-finished product to form a composite golf  │
│ club head                                       │
└─────────────────────────────────────────────────┘
```

FIG. 1

COMPOSITE GOLF CLUB HEAD AND METHOD FOR MANUFACTURING THE SAME

BACKGROUND OF THE INVENTION

1. Field of the Invention

The present invention relates to a golf club head, and more particularly to a composite golf club head and a method for manufacturing the composite golf club head that use composite materials to manufacture the composite golf club head.

2. Description of Related Art

For increasing design freedoms with a center of gravity of a conventional golf club head and a moment of inertia (MOI) in striking, partial structure of the conventional golf club head uses carbon fiber composite material, or the conventional golf club head uses a casted thin crown to decrease a weight of a body of the golf club head. The decreased weight of the body can be transferred to other parts of the conventional golf club head for changing the center of gravity of the conventional golf club head and the moment of inertia in swing.

However, the manufacturing method and structure of the conventional golf club head can still hardly provide a better golf club head. For example, to make a position of a sweet spot of a striking face overlap a position of the center of gravity of the golf club head, and in designing the position of center of gravity of the golf club head, it is necessary to take into account a weight transference after the golf club head is lightened to increase the moment of inertia in swing. In the present technology, it is difficult to control a thickness difference of the body of the golf club head to diversify the designs of the golf club head.

To overcome the shortcomings, the present invention provides a composite golf club head and a method for manufacturing a composite golf club head to mitigate or obviate the aforementioned problems.

SUMMARY OF THE INVENTION

The objective of the invention is to provide a composite golf club head and a method for manufacturing a composite golf club head to solve the problems that the manufacturing method and the structure of the conventional golf club head are difficult to control the position of the sweet spot of the striking face to be close to the position of the center of gravity of the golf club head, and it is difficult to control a thickness difference of the body of the golf club head to diversify the designs of the golf club head.

The method for manufacturing the composite golf club head is performed with a mold having a mold cavity, a hot pressing auxiliary forming mechanism, and a heater. The mold having a mold cavity opening formed on a front side of the mold cavity. The method has steps of:

(a) stacking multiple carbon fiber prepreg materials or multiple composite prepreg materials including carbon fiber on a side wall of the mold cavity of the mold to form a carbon fiber composite club head blank having a hosel and a front opening portion and being hollow;

(b) applying a vacuum negative pressure to an outer side and an inner side of the carbon fiber composite club head blank in the mold by the hot pressing auxiliary forming mechanism, simultaneously applying a positive pressure to the inner side of the carbon fiber composite club head blank, and heating the carbon fiber composite club head blank by the heater, wherein the mold having the carbon fiber composite club head blank is sealed by a vacuum negative pressure bladder of the hot pressing auxiliary forming mechanism, and the vacuum negative pressure bladder of the hot pressing auxiliary forming mechanism is mounted around the mold, a partial section of the vacuum negative pressure bladder is inserted into the inner side of the carbon fiber composite club head blank via the mold cavity opening of the mold, and the outer side of the carbon fiber composite club head blank abuts against a side wall of the mold cavity compactly;

a positive pressure vacuum bag is inserted into the mold cavity via the mold cavity opening of the mold and abuts against the inner side of the carbon fiber composite club head blank through the vacuum negative pressure bladder;

a vacuum negative pressure is applied to the outer side and the inner side of the carbon fiber composite club head blank by the vacuum negative pressure bladder and the mold;

a positive pressure is applied to the inner side of the carbon fiber composite club head blank by the positive pressure vacuum bag, wherein the outer side of the carbon fiber composite club head blank abuts against the side wall of the mold cavity compactly by a swelling force; and heating is applied to the carbon fiber composite club head blank by the heater, until the carbon fiber composite club head blank is heated and pressed to solidify to form a carbon fiber composite preliminary and then the carbon fiber composite preliminary is taken out;

(c) applying a removal leftover and surface finishing process to the carbon fiber composite preliminary to form a carbon fiber composite semi-finished product;

(d) providing a striking face pre-formed by one of a metal material and a composite material including carbon fiber; and (e) gluing and fixing the striking face on a front opening portion of the carbon fiber composite semi-finished product to form a composite golf club head.

When applying pressurization and the heating to the inner side and the outer side of the carbon fiber composite club head blank in the mold by the hot pressing auxiliary forming mechanism and the heater, a heating temperature is from 60° C. to 180° C., the vacuum negative pressure is from −0.1 bar to −1 bar, the positive pressure is from 1 bar to 10 bar, and a heating and pressing time is from 5 minutes to 60 minutes.

The composite golf club head has a carbon fiber composite body, a striking face, and a center of gravity.

The carbon fiber composite body is hollow and integrally has a hosel formed on the carbon fiber composite body and a front opening portion formed in the carbon fiber composite body. The carbon fiber composite body is formed by multiple carbon fiber prepreg materials or multiple composite prepreg materials including carbon fiber by molding, heating, a positive pressure acted on an exterior of said carbon fiber prepreg materials or composite prepreg materials including carbon fiber, and a vacuum negative pressure acted on an interior of said carbon fiber prepreg materials or composite prepreg materials including carbon fiber.

The striking face is made of one of carbon fiber composite and metal material, is fixedly connected to the front opening portion of the carbon fiber composite body, and has a geometric center defined on the striking face.

The center of gravity is defined in the composite golf club head. The center of gravity is vertically projected on the striking face to form a sweet spot. A position of the sweet spot is close to or overlaps a position of the geometric center.

The method for manufacturing the composite golf club head and the composite golf club head have the following advantages:

1. Making the position of the sweet spot close to or overlap the position of the geometric center: the carbon fiber composite body and the striking face are individually formed and then are fixedly connected to each other to integrate. It is easy to control the position of the sweet spot to be close to or overlap the position of the geometric center. While a golf ball is struck by the composite golf club head, energy of the composite golf club head can be efficiently transmitted to the golf ball.

2. Reducing a weight of the carbon fiber composite body: the integrated carbon fiber composite body having the hosel is made of multiple carbon fiber prepreg materials or multiple composite prepreg materials including carbon fiber. The carbon fiber composite body is formed by said carbon fiber prepreg layer or composite prepreg layer including carbon fiber in stacking. Under a condition that a body of a golf club head has good rigidity, a crown of the carbon fiber composite body is directly formed between a bottom and a hosel of the carbon fiber composite body. There is no seam between the crown, a sole, and the hosel of the carbon fiber composite body for increasing a structural strength of the carbon fiber composite body. The carbon fiber composite body generates a strain according to a stress in striking, and the strain can be suitably adjusted by a change of a stacking method. Therefore, the weight of the carbon fiber composite body can be reduced to increase a weight reduction margin of the carbon fiber composite body.

3. Ease in manufacturing according to performance of different golf club heads (especially a position of the center of gravity and moment of inertia): as mentioned above, the carbon fiber composite body and the striking face are individually formed and then are fixedly connected to each other to integrate. The carbon fiber composite body generates the strain according to the stress in striking to change a stacking structure. A weight distribution of the carbon fiber composite body is changed by the stacking method. Therefore, it is easy to manufacture the golf club head according to the performance of different golf club heads, especially the position of the center of gravity and the moment of inertia.

4. Diversifying a flexible design of the golf club head: as mentioned above, the present invention can choose different types of said carbon fiber prepreg materials or composite prepreg materials including carbon fiber, such as adding metal wires or metal meshes to the carbon fiber prepreg materials. By a stacking change of said carbon fiber prepreg materials or composite prepreg materials, the carbon fiber composite body and the striking face having the carbon fiber composite material or the metal material are combined with the same material or different materials. The combination between the carbon fiber composite body and the striking face is diversified to adjust a striking distance of the golf club head, ease of striking, a feel of striking or a striking voice frequency. Therefore, designs of the golf club head are flexibly diversified.

5. Improving a design freedom of the weight of the golf club head: as mentioned above, the carbon fiber composite body is formed by stacking, heating, and pressing said carbon fiber prepreg materials or composite prepreg materials including carbon fiber. Different types of said carbon fiber prepreg materials or composite prepreg materials including carbon fiber can be selected. Said carbon fiber prepreg materials or composite prepreg materials including carbon fiber has the stacking change. The weight of the crown and other parts in carbon fiber composite body can be reduced and transmitted to counterweight without affecting a necessary strength of the carbon fiber composite body. The carbon fiber composite body has the good weight reduction margin to relatively increase a counterweight margin and the design freedom of the weight.

6. Increasing structural strength of the carbon fiber composite body: in the method for manufacturing the composite golf club head, the molding, the heating, the positive pressure are acted on the exterior of said carbon fiber prepreg materials or composite prepreg materials including carbon fiber, and the vacuum negative pressure is acted on the interior of said carbon fiber prepreg materials or composite prepreg materials including carbon fiber to form the carbon fiber composite body being hollow and having the hosel and the front opening portion. With an isobaric uniformity of an air pressure, the exterior and the interior of said carbon fiber prepreg materials or composite prepreg materials including carbon fiber in the mold are pressed and heated simultaneously. A cross-linking reaction is generated in said carbon fiber prepreg materials or composite prepreg materials including carbon fiber to shape and solidify for increasing the structural strength of the carbon fiber composite body.

In the method for manufacturing the composite golf club head, when applying pressurization and the heating to the interior and the exterior of the carbon fiber composite club head blank in the mold by the hot pressing auxiliary forming mechanism and the heater, a heating temperature is from 60° C. to 180° C., the vacuum negative pressure is from −0.1 bar to −1 bar, the positive pressure is from 1 bar to 10 bar, and a heating and pressing time is from 5 minutes to 60 minutes. The solidified carbon fiber composite preliminary has a better solidification effect.

Other objectives, advantages and novel features of the invention will become more apparent from the following detailed description when taken in conjunction with the accompanying drawings.

BRIEF DESCRIPTION OF THE DRAWINGS

FIG. 1 is a flow chart of a method for manufacturing a composite golf club head in accordance with the present invention;

DETAILED DESCRIPTION OF THE PREFERRED EMBODIMENT

Figure 2:
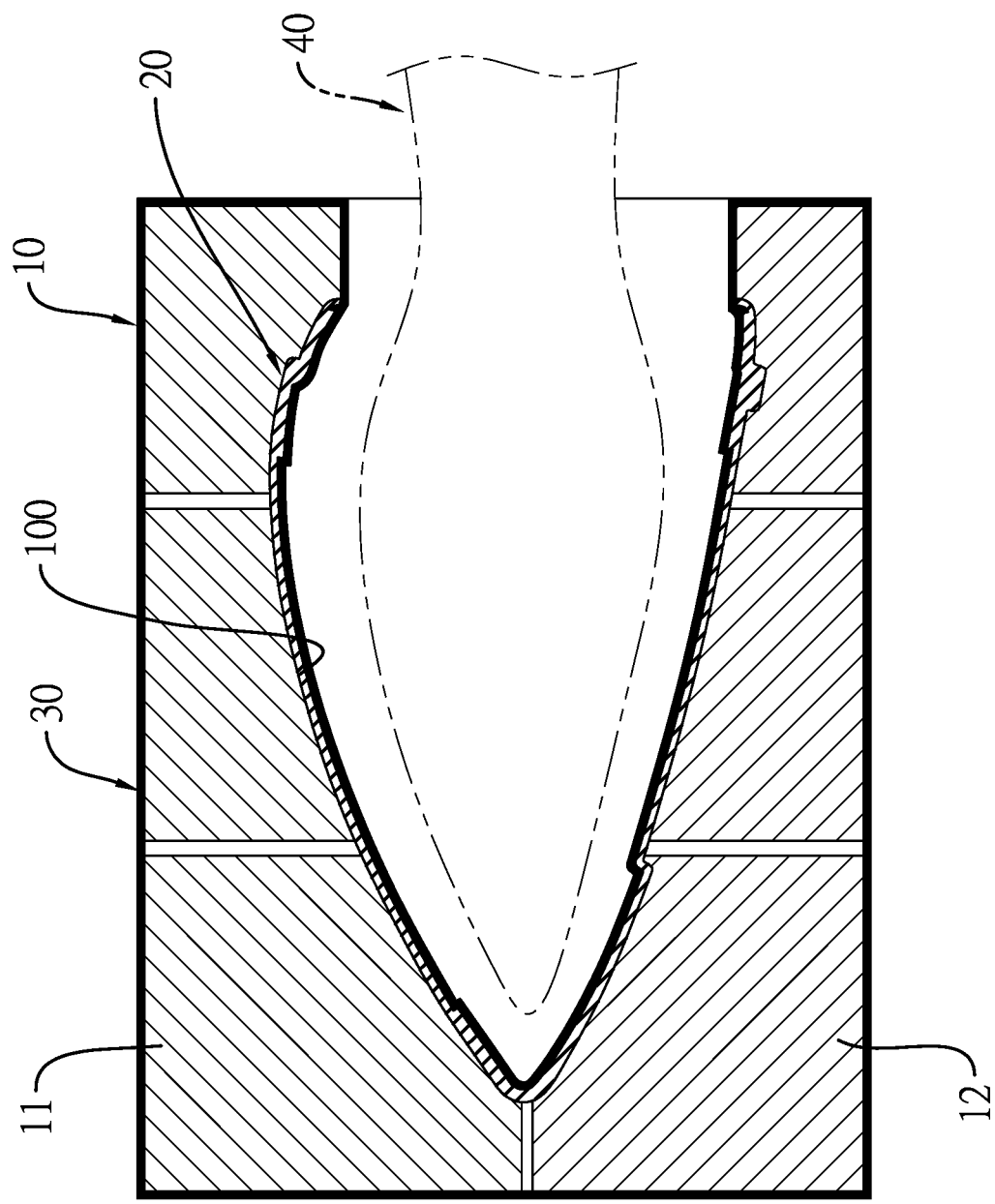
FIG. 2 is a cross sectional side view of a carbon fiber composite club head blank, showing that a mold having the carbon fiber composite club head blank is sealed by a vacuum negative pressure bladder of a hot pressing auxiliary forming mechanism, and a positive pressure vacuum bag is inserted into the carbon fiber composite club head blank in the mold.

With reference to FIG. 1, a method for manufacturing a composite golf club head in accordance with the present invention is used to manufacture a hollow golf club head, such as a wood type golf club head or an iron type golf club head. The method is performed with a mold, a hot pressing auxiliary forming mechanism, and a heater. With reference to FIG. 2, the mold 10 has a mold cavity 100. The mold cavity 100 is formed in the mold 10 and backwardly extends from a front end of the mold 10. A shape of the mold cavity 100 is set according to an actual external shape of a body of a pre-formed golf club head. The hot pressing auxiliary forming mechanism can receive the mold and provide a vacuum negative pressure and a positive pressure by the mold simultaneously. The heater provides a heating effect.

The mold 10 can be a single component, or the mold 10 can be an assembly including multiple die blocks clutched with each other. With reference to FIG. 2, the mold 10 has a first die block 11 and a second die block 12 clutched relative to the first die block 11.

With reference to FIG. 2, the hot pressing auxiliary forming mechanism has a vacuum negative pressure bladder 30 and a positive pressure vacuum bag 40. The vacuum negative pressure bladder 30 can sealingly wrap the mold 10 and is connected to a vacuum pumping device for applying a vacuum negative pressure effect to the mold cavity 100 of the mold 10. The positive pressure vacuum bag 40 is connected to a pressure supply device and is inserted into the mold cavity 100 of the mold for giving a positive pressure effect. The heater can apply a heating effect to the mold 10 located in a container. The heater is an electric heater for applying a stable controllable heating temperature to the mold 10.

The pressure supply device and the vacuum pumping device can be independent devices, or integrated into a single device with a vacuum pumping function and an air supply function. The vacuum negative pressure bladder and the positive pressure vacuum bag are both bags made of high strength materials with a heat resistance and a pressure resistance. The elastomeric material of one of the vacuum negative pressure bladder and the positive pressure vacuum bag is selected from a group consisting of rubber, polyurethane, thermoplastic elastomers, and high-molecular elastomeric resins.

The hot pressing auxiliary forming mechanism has the container. The container is able to be opened and closed and has an inner space. The inner space of the container is formed in the container for receiving the mold, the vacuum negative pressure bladder sealingly mounted around the mold and inserted into an inner side of the mold, and the positive pressure vacuum bag inserted into the mold and located in the vacuum negative pressure bladder. The heater is mounted in the container.

With reference to FIGS. 1 and 2, the method for manufacturing a composite golf club head has steps of:

(a) stacking multiple carbon fiber prepreg materials or multiple composite prepreg materials including carbon fiber on a side wall of the mold cavity 100 of the mold 10 to form a carbon fiber composite club head blank 20 having a hosel and a front opening portion and being hollow;

(b) applying a vacuum negative pressure to an outer side and an inner side of the carbon fiber composite club head blank in the mold 10 by the hot pressing auxiliary forming mechanism, simultaneously applying a positive pressure to the inner side of the carbon fiber composite club head blank, and heating the carbon fiber composite club head blank by the heater, wherein the mold having the carbon fiber composite club head blank is sealed by a vacuum negative pressure bladder of the hot pressing auxiliary forming mechanism, and the vacuum negative pressure bladder of the hot pressing auxiliary forming mechanism is mounted around the mold, a partial section of the vacuum negative pressure bladder is inserted into the inner side of the carbon fiber composite club head blank via a mold cavity opening of the mold, and the outer side of the carbon fiber composite club head blank abuts against a side wall of the mold cavity compactly;

a positive pressure vacuum bag is inserted into the mold cavity via the mold cavity opening of the mold and abuts against the inner side of the carbon fiber composite club head blank through the vacuum negative pressure bladder;

a vacuum negative pressure is applied to the outer side and the inner side of the carbon fiber composite club head blank by the vacuum negative pressure bladder and the mold 10;

a positive pressure is applied to the inner side of the carbon fiber composite club head blank by the positive pressure vacuum bag, wherein the outer side of the carbon fiber composite club head blank abuts against the side wall of the mold cavity compactly by a swelling force; and the heating is applied to the carbon fiber composite club head blank by the heater, until the carbon fiber composite club head blank is heated and is pressed to solidify to form a carbon fiber composite preliminary and then the carbon fiber composite preliminary is taken out;

(c) applying a removal leftover and surface finishing process to the carbon fiber composite preliminary to form a carbon fiber composite semi-finished product, wherein the material is spilled out of the mold 10 to form the leftover, and the leftover is removed when applying the removal leftover and surface finishing process to the carbon fiber composite preliminary;

(d) providing a striking face pre-formed by one of a metal material and a composite material including carbon fiber; and (e) gluing and fixing the striking face on a front opening portion of the carbon fiber composite semi-finished product to form a composite golf club head.

When stacking said carbon fiber prepreg materials or composite prepreg materials including carbon fiber on the side wall of the mold cavity 100 of the mold 10 to form a carbon fiber composite club head blank 20 having the hosel and the front opening portion and being hollow, the material of the carbon fiber prepreg materials is known. In general, a carbon fiber cloth is impregnated with a liquid resin to form the carbon fiber prepreg materials. The liquid resin is preferably a thermosetting resin. Furthermore, according to performances of different golf club heads, the present invention can choose different types of said carbon fiber prepreg materials or composite prepreg materials including carbon fiber, such as adding metal wires or metal meshes to the carbon fiber pregreg materials. The carbon fiber composite club head blank 20 having a specific stacking structure is made by a diversified stacking of said carbon fiber preperg materials or composite prepreg materials.

When stacking said carbon fiber prepreg materials or composite prepreg materials including carbon fiber on the side wall of the mold cavity 100 of the mold 10 to form a carbon fiber composite club head blank 20 having the hosel and the front opening portion and being hollow, if the mold 10 is the single component, said carbon fiber prepreg materials or composite prepreg materials including carbon fiber is directly stacked on the inner side wall of the mold cavity 100. If the mold 10 is the assembly including the first die block 11 and the second die block 12 clutched with each other, while the first die block 11 and the second die block 12 are separated from each other, said carbon fiber prepreg materials or composite prepreg materials including carbon fiber are glued on an inner side wall of the first die block 11 and an inner side wall of the second die block 12. While the first die block 11 and the second die block 12 are clamped and combined together, said carbon fiber prepreg materials or composite prepreg materials including carbon fiber stacked on the first die block 11 is connected to said carbon fiber prepreg materials or composite prepreg materials including carbon fiber stacked on the second die block 12 to form the hollow carbon fiber composite club head blank 20 having the front opening portion. In addition, while the first die block 11 and the second die block 12 are clamped and combined together, said carbon fiber prepreg materials or composite prepreg materials including carbon fiber are stacked on the inner side surface of the mold cavity 100 of the mold 10 to form the hollow carbon fiber composite club head blank 20 having the hosel and the front opening portion.

When applying pressurization and the heating to an interior and an exterior of the carbon fiber composite club head blank 20 in the mold 10 by the hot pressing auxiliary forming mechanism and the heater, the heating temperature is from 60° C. to 180° C., the vacuum negative pressure is from −0.1 bar to −1 bar, the positive pressure is from 1 bar to 10 bar, and a heating and pressing time is from 5 minutes to 60 minutes. With an isobaric uniformity of an air pressure, the exterior and the interior of said carbon fiber prepreg materials or composite prepreg materials including carbon fiber in the mold 10 are pressed and heated simultaneously to generate a cross-linking reaction to solidify.

When the hot pressing auxiliary forming mechanism has the container being able to be opened and closed, in the step of applying a vacuum negative pressure to the exterior of the carbon fiber composite club head blank 20 in the mold 10 by the hot pressing auxiliary forming mechanism, simultaneously applying the positive pressure to the interior of the carbon fiber composite club head blank 20, and heating the carbon fiber composite club head blank 20 by the heater, the mold 10 having the hollow carbon fiber composite club head blank 20, the vacuum negative pressure bladder 30 covering the exterior of the mold 10, and the positive pressure vacuum bag 40 inserted into the interior of the carbon fiber composite club head blank 20 are put into the container simultaneously. The heater heats the hollow carbon fiber composite club head blank 20 in the container.

Figure 3:
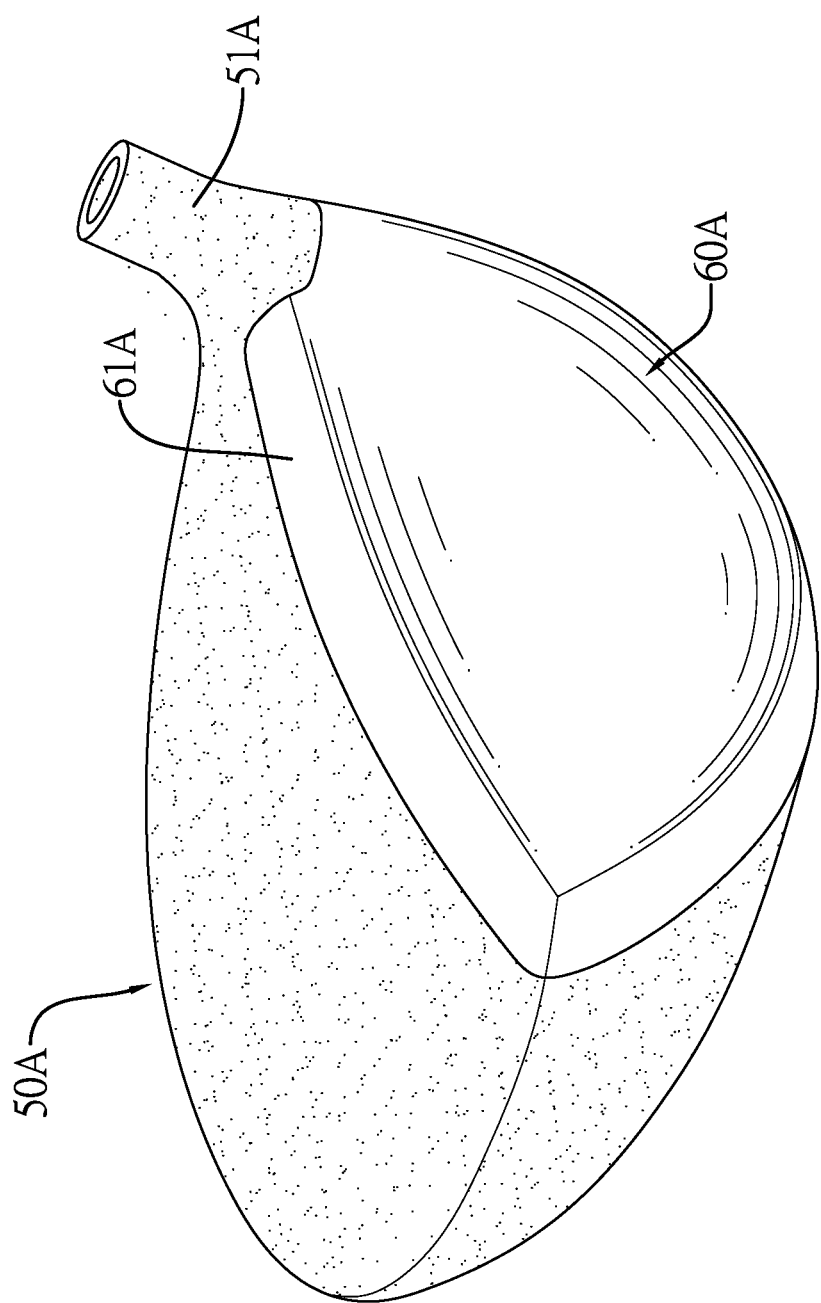
FIG. 3 is a perspective view of a first embodiment of a composite golf club head in accordance with the present invention, showing that the composite golf club head is a wood type golf club head.
Figure 4:
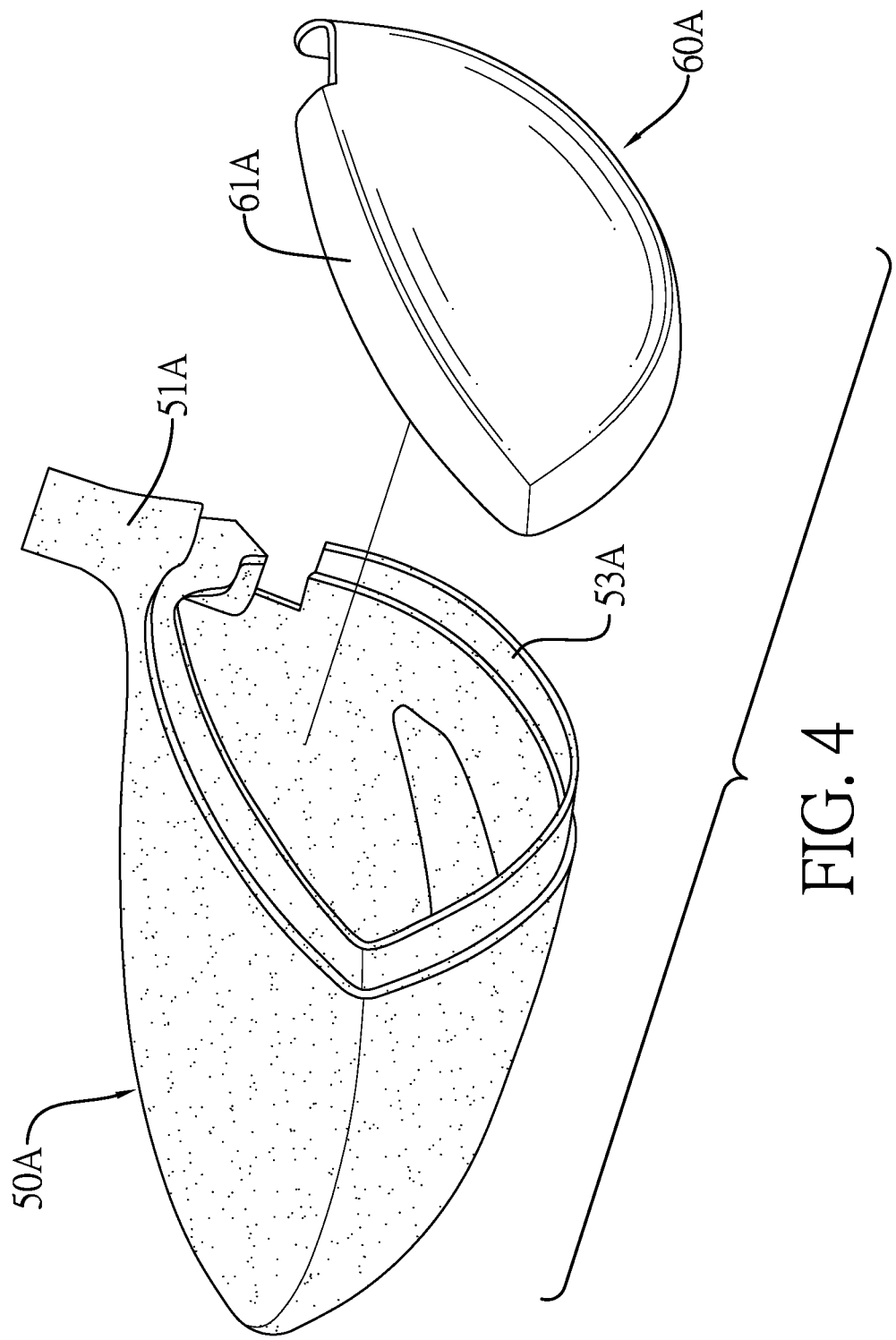
FIG. 4 is an exploded perspective view of the composite golf club head in FIG. 3.
Figure 5:
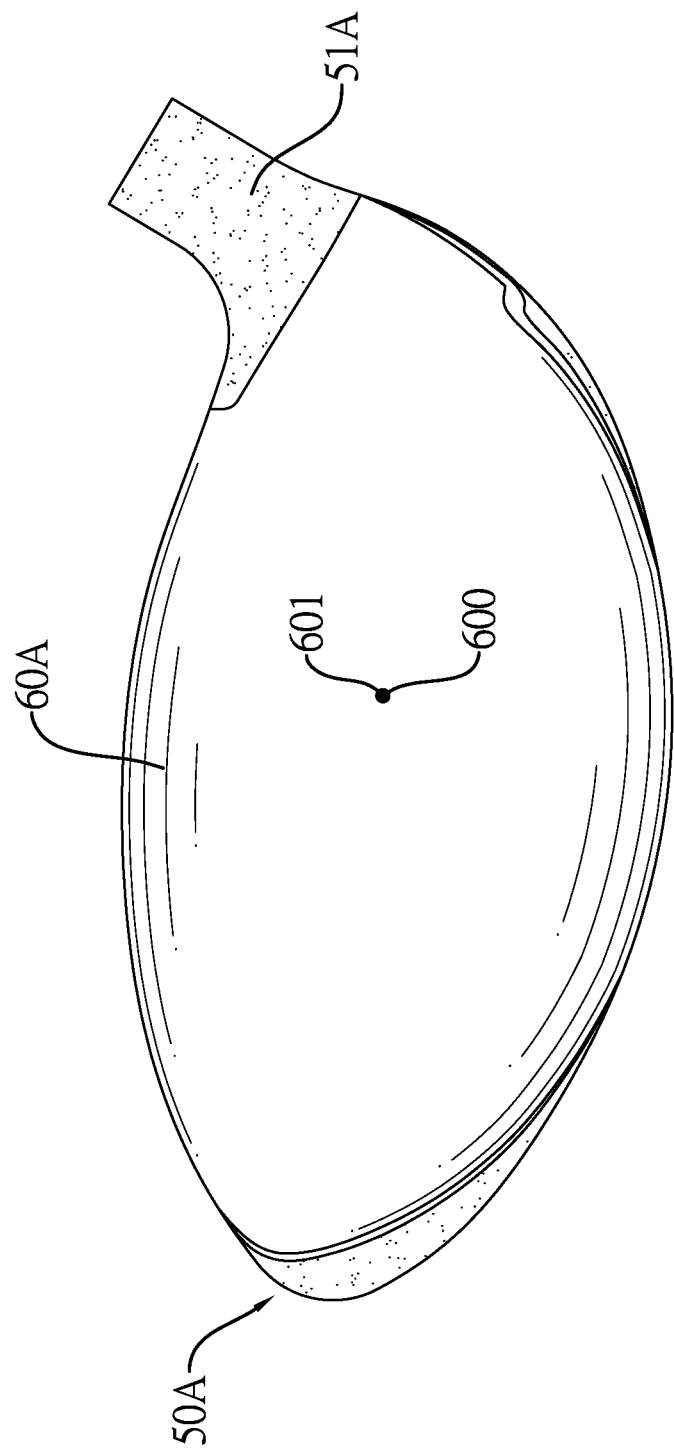
FIG. 5 is a front view of the composite golf club head in FIG. 3.
Figure 6:
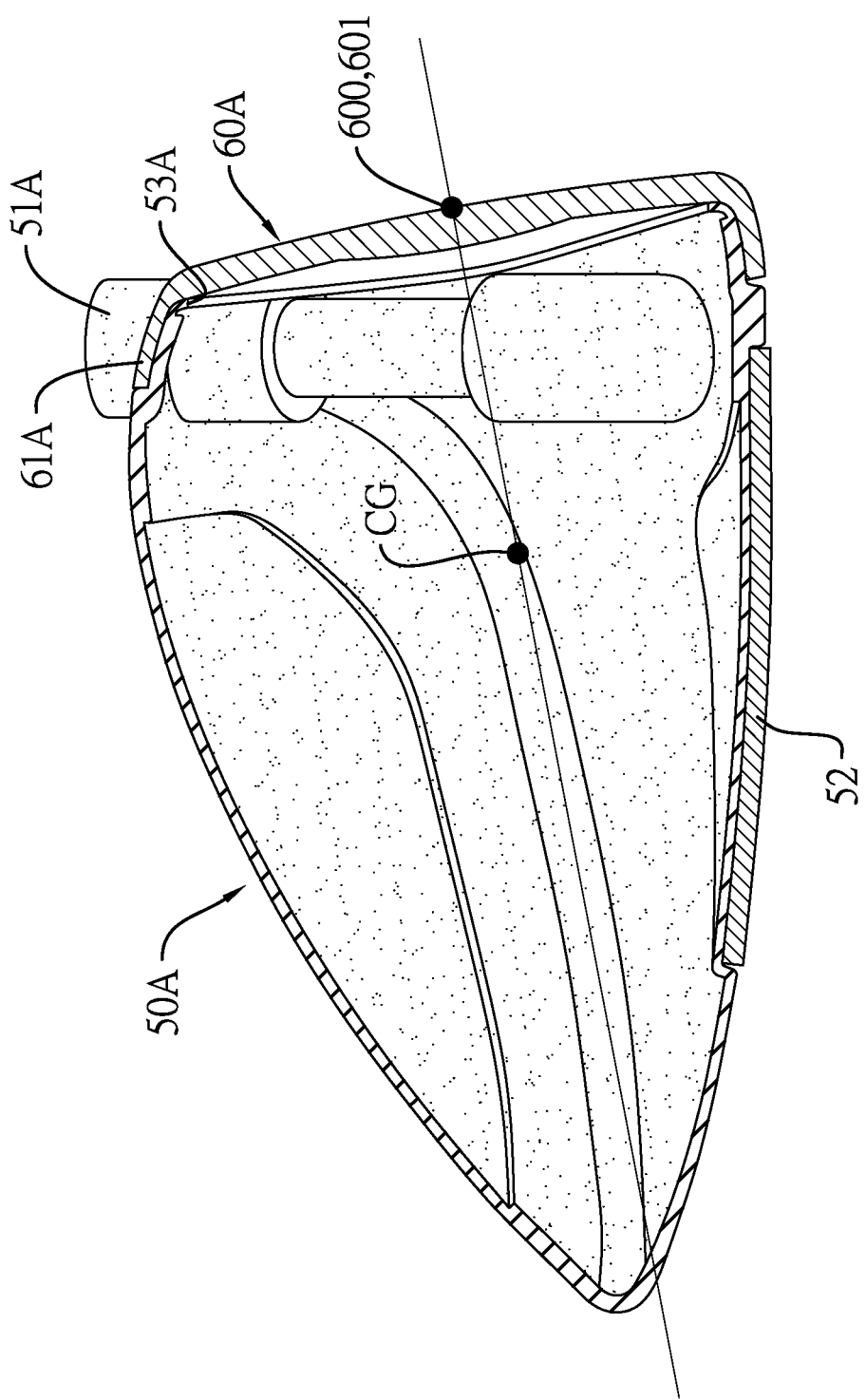
FIG. 6 is a cross sectional side view of the composite golf club head in FIGS. 3.
Figure 7:
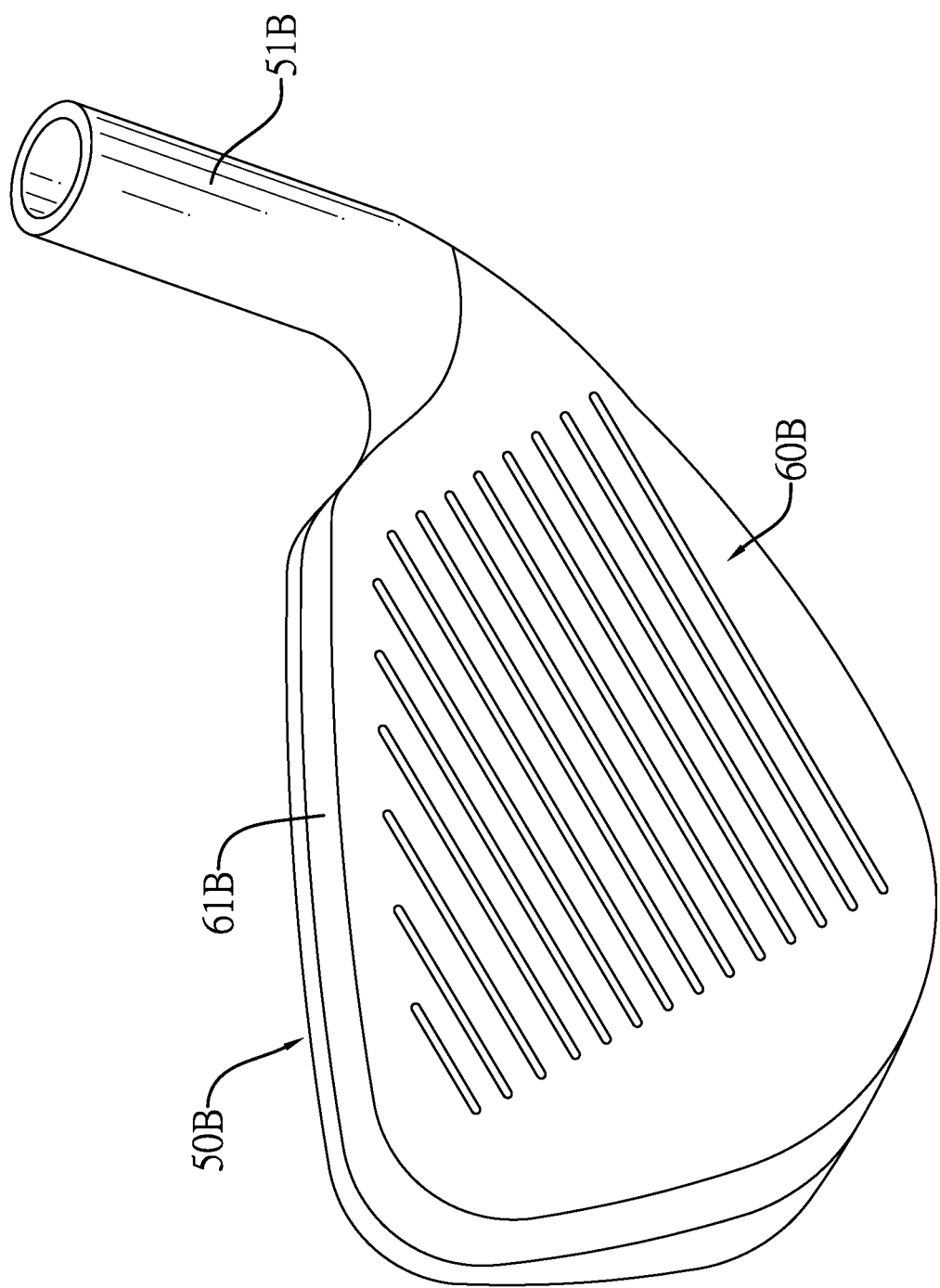
FIG. 7 is a perspective view of a second embodiment of a composite golf club head in accordance with the present invention, showing that the composite golf club head is an iron type golf club head.

With reference to FIG. 3, the composite golf club head is the hollow wood type golf club head. Or with reference to FIG. 7, the composite golf club head is the hollow iron type golf club head. With reference to FIGS. 3 and 7, the composite golf club head has a carbon fiber composite body 50A, 50B, and a striking face 60A, 60B.

The carbon fiber composite body 50A, 50B is formed by said carbon fiber prepreg materials or the composite prepreg materials including carbon fiber with stacking, the positive pressure effect acted on the exterior of said carbon fiber prepreg materials or composite prepreg materials including carbon fiber, the vacuum negative pressure acted on the interior of said carbon fiber prepreg materials or composite prepreg materials including carbon fiber, and the heating to form the hollow integrate carbon fiber body 50A, 50B having the hosel 51A, 51B and the front opening portion 53A.

The striking face 60A, 60B is made of carbon fiber composite or metal material. The metal material of the striking face 60A, 60B is titanium alloy or stainless steel. The striking face 60A, 60B is fixedly glued to the front opening portion 53A of the carbon fiber composite body 50A, 50B. The striking face 60A, 60B has a back side and a connecting portion 61A, 61B formed on the back side of striking face 60A, 60B. The connecting portion 61A, 61B of the striking face 60A, 60B is mounted around and is fixedly glued to the front opening portion 53A of the carbon fiber composite body 50A, 50B to form an integrated element.

The composite golf club head has a center of gravity CG defined in the composite golf club head. The striking face 60A has a geometric center 600 defined on the striking face 60A. The center of gravity CG is projected on the striking face 60A to form a sweet spot 601. It is best that a position of the sweet spot 601 overlaps a position of the geometric center 600.

The carbon fiber composite body 50A has a rear end, a bottom, and at least one metal counterweight body 52. The at least one metal counterweight body 52 is mounted on one of the rear end of the carbon fiber composite body 50A and the bottom of the carbon fiber composite body 50A. In addition, the composite golf club head has a metal inner rod part mounted in the hosel 51A.

Accordingly, the carbon fiber composite body 50A, 50B is formed by said carbon fiber prepreg materials or composite prepreg materials including carbon fiber with stacking, the positive pressure, the vacuum negative pressure, and the heating to form the hollow integrate carbon fiber body 50A, 50B having the hosel 51A, 51B and the front opening portion 53A. The striking face 60A, 60B is made of the carbon fiber composite or metal material, and is fixedly glued to the front opening portion 53A of the carbon fiber composite body 50A, 50B. Thus, a weight of the carbon fiber composite body 50A, 50B can be reduced. It is easy to change a structure of the composite golf club head or a stacking way of said carbon fiber preperg materials or composite prepreg materials including carbon fiber according to striking distances or feel of striking of different golf club heads. Designs of the golf club head are flexibly diversified. It is easy to control the position of the sweet spot of the striking face 60A, 60B. A striking performance of the composite golf club head is enhanced.

What is claimed is:

1. A method for manufacturing a composite golf club head, the method performed with a mold having a mold cavity, a hot pressing auxiliary forming mechanism, and a heater, the mold having a mold cavity opening formed on a front side of the mold cavity, and the method comprising steps of:

stacking multiple carbon fiber prepreg materials or multiple composite prepreg materials including carbon fiber on a side wall of the mold cavity of the mold to form a carbon fiber composite club head blank having a hosel and a front opening portion and being hollow;

applying a vacuum negative pressure to an outer side and an inner side of the carbon fiber composite club head blank in the mold by the hot pressing auxiliary forming mechanism, simultaneously applying a positive pressure to the inner side of the carbon fiber composite club head blank, and heating the carbon fiber composite club head blank by the heater, wherein the mold having the carbon fiber composite club head blank is sealed by a vacuum negative pressure bladder of the hot pressing auxiliary forming mechanism, and the vacuum negative pressure bladder of the hot pressing auxiliary forming mechanism is mounted around the mold, a partial section of the vacuum negative pressure bladder is inserted into the inner side of the carbon fiber composite club head blank via the mold cavity opening of the mold, and the outer side of the carbon fiber composite club head blank abuts against a side wall of the mold cavity compactly;

a positive pressure vacuum bag is inserted into the mold cavity via the mold cavity opening of the mold and abuts against the inner side of the carbon fiber composite club head blank through the vacuum negative pressure bladder;

a vacuum negative pressure is applied to the outer side and the inner side of the carbon fiber composite club head blank by the vacuum negative pressure bladder and the mold;

a positive pressures applied to the inner side of the carbon fiber composite club head blank by the positive pressure vacuum bag, wherein the outer side of the carbon fiber composite club head blank abuts against the side wall of the mold cavity compactly by a swelling force; and heating is applied to the carbon fiber composite club head blank by the heater, until the carbon fiber composite club head blank is heated and is pressed to solidify to form a carbon fiber composite preliminary and then the carbon fiber composite preliminary is taken out;

applying a removal leftover and surface finishing process to the carbon fiber composite preliminary to form a carbon fiber composite semi-finished product;

providing a striking face pre-formed by one of a metal material and a composite material including carbon fiber; and gluing and fixing the striking face on a front opening portion of the carbon fiber composite semi-finished product to form a composite golf club head.

2. The method for manufacturing the composite golf club head as claimed in claim 1, wherein when applying pressurization and heating to an interior and an exterior of the carbon fiber composite club head blank in the mold by the hot pressing auxiliary forming mechanism and the heater, a heating temperature is from 60° C. to 180° C., the vacuum negative pressure is from −0.1 bar to −1 bar, the positive pressure is from 1 bar to 10 bar, and a heating and pressing time is from 5 minutes to 60 minutes.

3. The method for manufacturing the composite golf club head as claimed in claim 2, wherein the mold has a first die block and a second die block clutched relative to the first die block, when stacking the carbon fiber prepreg materials or the composite prepreg materials including carbon fiber on the side wall of the mold cavity of the mold to form the carbon fiber composite club head blank having the hosel and the front opening portion and being hollow, said carbon fiber prepreg materials or composite prepreg materials including carbon fiber are glued on an inner side wall of the first die block and an inner side wall of the second die block while the first die block and the second die block are separated from each other, and while the first die block and the second die block are clamped and combined together, said carbon fiber prepreg materials or composite prepreg materials including carbon fiber stacked on the first die block is connected to said carbon fiber prepreg materials or composite prepreg materials including carbon fiber stacked on the second die block to form the carbon fiber composite club head blank.

4. The method for manufacturing the composite golf club head as claimed in claim 3, wherein
the hot pressing auxiliary forming mechanism has a container, the container is able to be opened and closed and has an inner space, the inner space of the container is formed in the container for receiving the mold, the vacuum negative pressure bladder is disposed outside the mold, the positive pressure vacuum bag is disposed inside the mold, and the heater is mounted in the container; and
when applying the vacuum negative pressure to the exterior of the carbon fiber composite club head blank in the mold by the hot pressing auxiliary forming mechanism, simultaneously applying the positive pressure to the interior of the carbon fiber composite club head blank, and heating the carbon fiber composite club head blank by the heater,
the mold having the carbon fiber composite club head blank, the vacuum negative pressure bladder disposed outside and around the mold, and the positive pressure vacuum bag disposed inside the carbon fiber composite club head blank are disposed in the container, and then the carbon fiber composite club head blank in the container is heated by the heater.

5. The method for manufacturing the composite golf club head as claimed in claim 3, wherein the metal material of the striking face is titanium alloy or stainless steel.

6. The method for manufacturing the composite golf club head as claimed in claim 2, wherein
the hot pressing auxiliary forming mechanism has a container, the container is able to be opened and closed and has an inner space, the inner space of the container is formed in the container for receiving the mold, the vacuum negative pressure bladder disposed outside the mold, and the positive pressure vacuum bag disposed inside the mold, and the heater is mounted in the container; and
when applying the vacuum negative pressure to the exterior of the carbon fiber composite club head blank in the mold by the hot pressing auxiliary forming mechanism, simultaneously applying the positive pressure to the interior of the carbon fiber composite club head blank, and heating the carbon fiber composite club head blank by the heater, the mold having the carbon fiber composite club head blank, the vacuum negative pressure bladder disposed outside and around the mold, and the positive pressure vacuum bag disposed inside the carbon fiber composite club head blank are disposed in the container, and then the carbon fiber composite club head blank in the container is heated by the heater.

7. The method for manufacturing the composite golf club head as claimed in claim 2, wherein the metal material of the striking face is titanium alloy or stainless steel.

8. The method for manufacturing the composite golf club head as claimed in claim 1, wherein
the hot pressing auxiliary forming mechanism has a container, the container is able to be opened and closed and has an inner space, the inner space of the container is formed in the container for receiving the mold, the vacuum negative pressure bladder sealingly mounted around the mold and inserted into the inner side of the mold, and the positive pressure vacuum bag inserted into the mold and located in the vacuum negative pressure bladder, and the heater is mounted in the container; and when applying the vacuum negative pressure to the outer side and the inner side of the carbon fiber composite club head blank in the mold by the hot pressing auxiliary forming mechanism, simultaneously applying a positive pressure to the inner side of the carbon fiber composite club head blank, and heating the carbon fiber composite club head blank by the heater, wherein the mold having the carbon fiber composite club head blank, the vacuum negative pressure bladder disposed outside the mold, and the positive pressure vacuum bag disposed inside the carbon fiber composite club head blank are disposed in the container, and then the carbon fiber composite club head blank in the container is heated by the heater.

9. The method for manufacturing the composite golf club head as claimed in claim 1, wherein the metal material of the striking face is titanium alloy or stainless steel.

* * * * *